United States Patent [19]

Broussard

[11] Patent Number: 4,744,452
[45] Date of Patent: May 17, 1988

[54] AUTOMATED PILER ASSEMBLY

[76] Inventor: V. Kenneth Broussard, P.O. Box 558, St. Martinsville, La. 70582

[21] Appl. No.: 926,873

[22] Filed: Nov. 5, 1986

Related U.S. Application Data

[63] Continuation of Ser. No. 827,197, Feb. 7, 1986, abandoned, which is a continuation of Ser. No. 549,732, Nov. 8, 1983, abandoned.

[51] Int. Cl.$^4$ ............................................. B65G 21/10
[52] U.S. Cl. ................................... 198/314; 56/14.3; 56/192
[58] Field of Search ............... 198/304, 313, 314, 317; 56/13.9, 14.3, 14.5, 192

[56] References Cited

U.S. PATENT DOCUMENTS

| Re. 23,083 | 2/1949 | Andrews et al. | 56/16.6 |
|---|---|---|---|
| 2,427,313 | 9/1947 | Thomson | 56/192 |
| 2,669,829 | 2/1954 | Pugh | 56/14.5 |
| 2,942,677 | 6/1950 | Gray | 180/212 |
| 3,002,330 | 10/1961 | Thomson | 56/14.3 |
| 3,090,183 | 5/1963 | Thomson | 56/1 |
| 3,095,679 | 7/1963 | Pugh et al. | 56/192 |
| 3,236,324 | 2/1966 | Levratto | 180/242 |
| 3,448,564 | 6/1969 | Chauffe | 56/14.3 |
| 3,475,886 | 11/1969 | Hart | 56/DIG. 2 |
| 3,481,121 | 12/1969 | Broussard | 56/14.3 |
| 3,538,998 | 11/1970 | Willett | 56/14.3 |
| 3,583,135 | 6/1971 | Broussard | 56/14.3 |
| 3,613,336 | 11/1971 | Smith | 56/192 |
| 3,861,535 | 1/1975 | Huxley, III et al. | 180/242 |
| 4,165,596 | 8/1979 | Duncan | 56/14.3 |
| 4,232,775 | 11/1980 | Duncan | 198/304 |
| 4,380,281 | 4/1983 | Duncan | 198/304 |
| 4,483,130 | 11/1984 | Duncan | 56/14.3 |

Primary Examiner—Joseph E. Valenza
Attorney, Agent, or Firm—Arnold, White & Durkee

[57] ABSTRACT

An improved device is disclosed for piling stalk material after it is gathered for harvesting. Stalk material is frictionally engaged and conveyed from a cutting assembly to a discharge assembly. A pressure bar urges a portion of the stalk material against sticker chain. A discharge assembly is attached to the end of the piler arm assembly and may be moved to various positions. In at least one position, the fall of stalk material is directed.

17 Claims, 2 Drawing Sheets

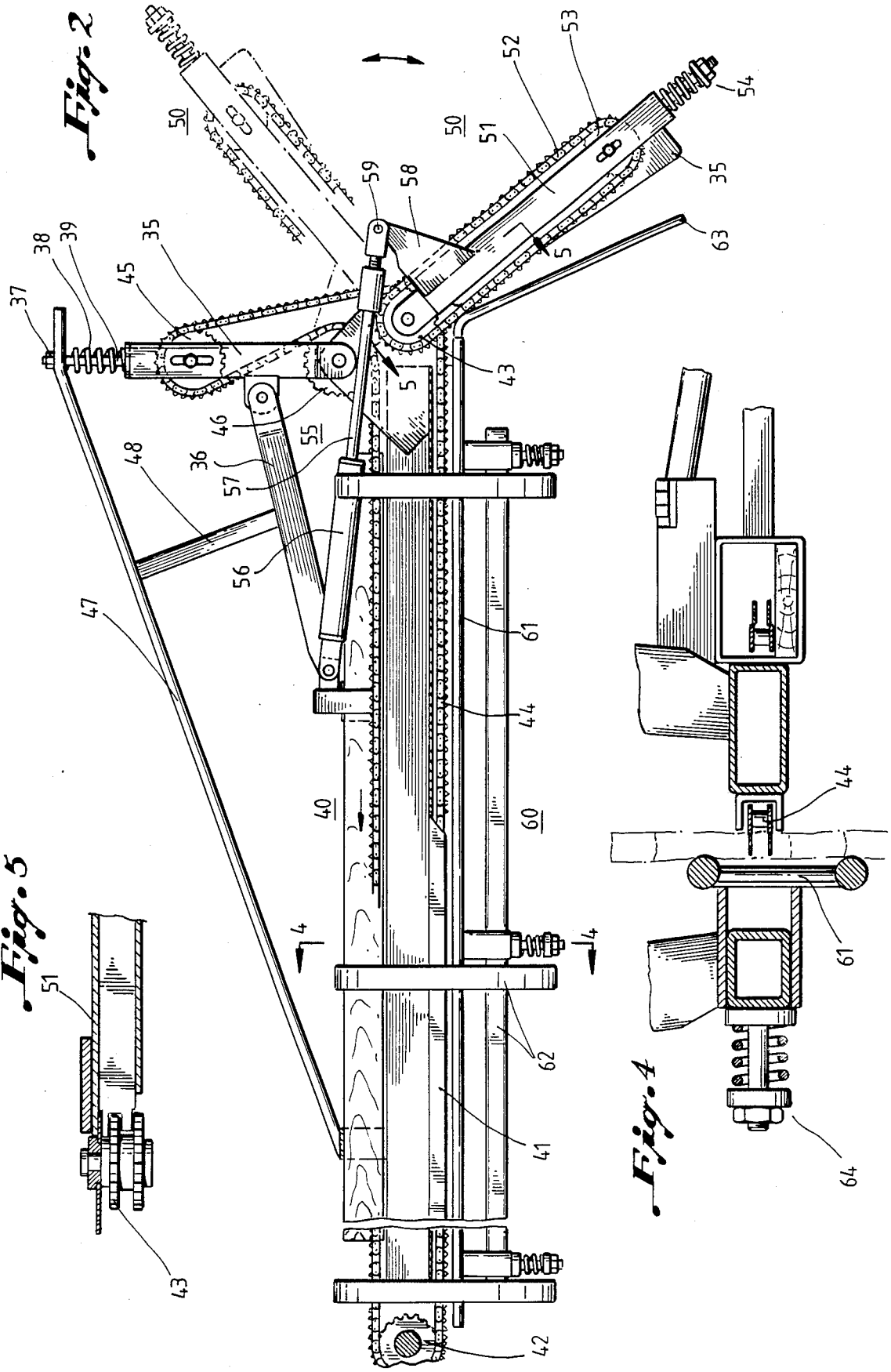

4,744,452

AUTOMATED PILER ASSEMBLY

This is a continuation of application Ser. No. 827,197, filed Feb. 7, 1986, now abandoned, which was a continuation of application Ser. No. 549,732, filed Nov. 8, 1983, now abandoned.

BACKGROUND OF THE INVENTION

One of the primary uses for the apparatus of this invention is in combination with sugar cane harvesting machinery, more specifically, the piling of sugar cane in windrows. The apparatus is, however, equally adaptable to any stalk harvesting equipment, i.e. corn, and its use with sugar cane harvesting equipment is merely the preferred embodiment.

Sugar cane is primarily a tropical crop requiring at least 60 inches of rain per year or the equivalent in irrigation. Although the crop is grown in many tropical and sub-tropical areas, the main users of mechanized crop harvesters are plantation owners and sugar cane farmers in Hawaii, Louisiana, Florida and Australia.

Sugar cane is generally harvested by cutting the stalks at the surface of the ground, and at the topmost mature internode. After cutting the sugar cane, the stalks are often piled into windrows where they are later loaded into wagons or conveyors for transport to a processing plant. On most sugar cane farms the cane is loaded onto transport vehicles by mechanical loaders. The use of such loaders in sugar cane fields must be controlled so that the fields and crops are not destroyed by tires or by the weight of the mechanical loaders.

One of the problems encountered in the mechanized harvesting of sugar cane concerns the piling of the cane into windrows. Plantation owners are concerned with the economy and efficiency of harvesting their crops. If more than one row of cane can be piled into a single windrow, the loaders, trucks, and wagons will be able to travel a substantially shorter distance. In addition, the clear rows will allow maneuvering room for the loading and transporting machinery. Both aspects reduce the amount of time in the field, thus aiding the efficiency of the plantation owner's operation.

The piling of more than one row of cane into a single windrow presents significant advantages to harvesters of sugar cane. By stacking the cane, a denser mat is formed and a larger "bite" can be obtained by mechanical loaders thus aiding in their overall efficiency. This technique also helps in obtaining a cleaner sample of the cane. Furthermore, where the cane is burned after cutting to remove extraneous branches and leafy material there is a better burn with larger piles. Thus it can be seen that the piling of a plurality of cut sugar cane into a single windrow for loading provides a series of advantages to the sugar cane farmer and processor.

In response to the need for the specialized piling of sugar cane into windrows, several different piling arm assemblies have been produced for use with motorized cane harvesters, and more specifically different types of discharge ends have been employed on piler arms to direct the fall of sugar cane into windrows.

U.S. Pat. No. 2,427,313 to Thomson discloses an assembly which piles the cane crosswise to the rows by lifting the cane into a vertical position before discharging it from the piler arm.

U.S. Pat. No. 2,669,829 to Pugh discloses adjustable deflectors and guide blades used to direct the fall of cane from the piler arm assembly. U.S. Pat. No. 3,095,679 also to Pugh embodies a similar deflector bar means for directing the fall of cane.

U.S. Pat. No. 3,448,564 to Chauffe discloses an extension bar on the end of the piler arm which turns about the center of rotation of a sprocket so that the overall length of the piler mechanism may be shortened.

U.S. Pat. No. 3,481,121 to V. P. Broussard discloses a piling arm with a flexible free end which can be controlled to pile can normal to any piling row for any angle of the piling arm.

U.S. Pat. No. 4,165,596 to Duncan discloses a pair of articulated pilers with free ends which may be pivoted. U.S. Pat. No. 4,232,775 also to Duncan discloses single articulation pilers with adjustable cane-butt deflectors and rub bars for directing the fall of cane. U.S. Pat. No. 4,380,281 also to Duncan discloses rub bar arms mounted on the free ends of pilers along with chain wipers, each individually pivoted to direct the fall of cut cane.

The improved automated piler assembly of this invention dispenses with the inefficient system of gates and bars and the complicated system for manipulating them as shown in the prior art and replaces them with a single articulated unit which is preferably hydraulically actuated.

It is important in the piling operation to maintain a confined, guided control over the cut sugar cane. The improved automated piler arm assembly of this invention permits such control while the cane is being directed, thus aiding in the elimination of clogged discharge ends.

Yet another advantage of the improved piler assembly of this invention is the use of a separate sticker chain on the discharge end of the piler arm, thus eliminating chains and sprocket components on piler arms with ends which flex or pivot.

SUMMARY OF THE INVENTION

The improved automated piler assembly of this invention includes a piler arm assembly, a pressure bar assembly and a discharge assembly. Other assemblies, subassemblies and equipment are used to make up the harvester or overall equipment to which the piler assembly of this invention is attached.

A gathering assembly is used to raise, when necessary, sugar cane or like crop and to convey such stalk material to a cutting assembly. In conventional sugar cane gathering assemblies, the assembly includes a sticker chain together with an assortment of sprockets and drives for guiding and conveying the stalk material.

For purposes of this application the phrase "means for frictionally engaging stalk material" should be understood to include conventional sticker chains as well as a variety of substitute equivalent materials. For instance, conveyor belts with abrasive surfaces, a serpentine arrangement of belt-like material or any other fabric, chain or device which can be used or adapted to frictionally retain stalk material can be conveniently substituted. The gathering assembly of this invention includes such means for frictionally engaging in whatever form is adapted for the specific intended end use.

The gathering assembly conveys the stalk material to a cutting assembly. The cutting assembly typically includes a bottom cutter and a top cutter. While the specific cutters are not considered a part of this invention a brief mention is warranted. In sugar cane harvesting apparatus the bottom cutter consists of a rotating disc having blades attached thereto. This portion of the cutting assembly severs the sugar cane stalk as close to the ground as is reasonably possible. Subsequent to the bottom cutter severing the sugar cane a top cutter assembly severs the upper portion of the cane which typically includes leafy, undesirable material. The particular cutting assembly and designed features thereof have been the subject of recent patent activity. Descriptions of cutter assemblies which have utility in sugar cane harvesting, corn harvesting or other types of harvesting activity are well known and available in the literature.

As the stalk material emerges from the cutting assembly it is typically conveyed to a pilar assembly. It is an improved piler assembly which is the subject matter of this invention. In its broadest form the piler arm assembly of this invention includes means for frictionally engaging stalk material, a pressure bar assembly and a discharge assembly. The means for frictionally engaging stalk material conveys the cut stalk from the cutting assembly to and through the piler arm assembly and eventually to the discharge assembly. In the most preferred embodiment of this invention the means for frictionally engaging the stalk material is a sticker chain.

The improved piler assembly of this invention has demonstrated exceptional utility in sugar cane harvesters. The piling assembly is typically attached to the mainframe of the sugar cane harvester in a fashion such that the harvested cane can be directed straight back from the direction of travel of the harvester or angled to the side. To angle the cane fall direction to the side, the piler assembly is mechanically moved from its position adjacent the mainframe to a position angularly displaced from the mainframe. A single displaced position or a plurality of displaced positions can be used depending on the complexity of the harvesting apparatus itself. In the most preferred embodiment the movement of the piler assembly to and from the mainframe is controlled hydraulically.

The piler assembly typically pivots about a point of attachment to the mainframe. In sugar cane harvesters a arm which is hydraulically actuated to various positions of angular displacement from the mainframe. Recently, however, two row harvesters have become useful in the harvesting of cane. In two row harvesters, two piler assemblies are found, one on each side of the mainframe. Each of these piler assemblies on a two row harvester can be individually controlled to direct the fall of the cut sugar cane.

A pressure bar assembly is aligned in a manner to functionally cooperate with the means for frictionally engaging stalk material. The pressure bar assembly can include a tension adjustable bar with various extensions for guiding, controlling and confining the fall of sugar cane. In other embodiments the pressure bar assembly may be a mated chain or belt which can be either moving or stationary. The essential features of the pressure bar assembly is that it apply enough pressure to at least a portion of the stalk material to prevent it from disengaging from the frictional grasp of the sticker chain or other means for frictionally engaging. In some instances the cut cane will be positively engaged, i.e. wedged, or penetrated by the sticker chain and therefore the pressure bar assembly will serve no function with regard to these positively engaged stalks. However, in certain other instances the pressure bar assembly will create the necessary pressure to maintain the confinement and control of the stalk material in conveying it from the cutting assembly to the discharge assembly.

The discharge assembly of this invention is attached to one end of the piler arm. In certain prior art embodiments of discharge assemblies a continuous chain is used for conveying the stalk material from the cutting assembly through the very end of the discharge assembly. In the improved automated piler assembly of this invention a second sticker chain is used for conveying the stalk material to the desired discharge position. As in other assemblies in this invention the discharge assembly includes a sticker chain or its equivalent and optionally may include means for disengaging waste material such as leaves, twigs and the like from the sticker chain. A specific advantage of the assembly of this invention is that at the intersection of the sticker chain from the piler assembly and the sticker chain from the discharge assembly a cleaning of the sticker chains is accomplished by the interaction of the two sticker chains.

Other assemblies may be found in the sugar cane harvesting apparatus which comprises the most preferred embodiment of this invention. A hydraulic motor assembly is generally used to power the harvester apparatus. A series of hydraulic, mechanical and electrical control assemblies are used to direct the travel of the harvester, control the gathering assembly and placement of the piler arm assemblies. These other assemblies are conventional in the art and do not form a part of this invention other than to the extent they are interconnected with the piler assembly.

Examples of the more important features of this invention have been broadly outlined in order that the detailed description that follows may be better understood and so that the contributions which this invention provides to the art may be better appreciated. There are, of course, additional features of the invention which will be described herein and which will be included within the subject matter of the claims appended hereto.

BRIEF DESCRIPTION OF THE DRAWINGS

Additional objects, features and advantages of the present invention will become apparent by referring to the following summary and detailed description of the preferred embodiments in connection with the accompanying drawings, wherein like reference numerals refer to like elements throughout all the figures. In the drawings:

FIG. 2 is a top view of the right piler arm assembly with the pivotal discharge unit attached. In addition, phantom lines in the figure show the pivotal direction of the discharge assembly.

FIG. 4 is a cross-sectional view of the piler arm taken along line 4—4 of FIG. 2.

FIG. 5 is a cross-section view taken at line 5—5 of FIG. 2 showing the multiple sprocket arrangement.

DETAILED DESCRIPTION OF THE PREFERRED EMBODIMENT

The following refers in detail to the present preferred embodiment of the invention as illustrated in the accompanying drawings.

Figure 1:
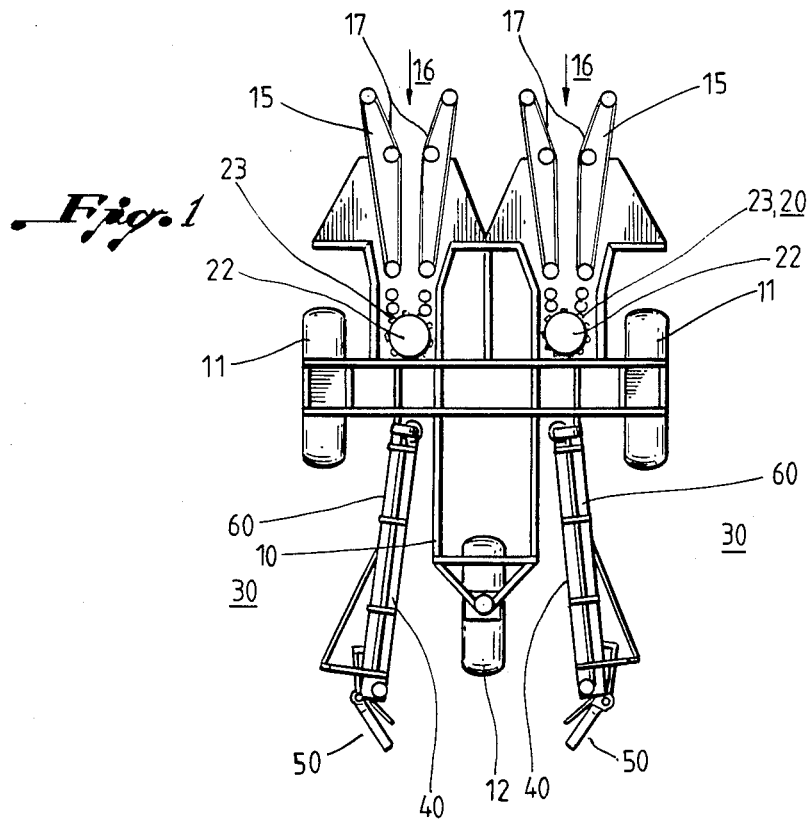
FIG. 1 is a plan view of the invention mounted on a two-row sugar cane harvester. The discharge assemblies are shown in their position for directing the fall of sugar cane behind and to the center of the harvester.

FIG. 1 shows a main frame 10 in a tricycle configuration which includes main wheels 11 and a centered steerable rear wheel 12. Other configurations of the main frame and wheels are equally adaptable to the piler assembly of this invention. Specifically, a four wheeled harvester of either the single row or double row type are equally useful with the improved pilar assembly of this invention.

FIG. 1 also shows a gathering assembly 15, a cutting assembly 20 and the piler assembly 30. Piler assembly 30 includes a piler arm assembly 40, a discharge assembly 50 and a pressure bar assembly 60.

FIG. 1 demonstrates the travel of sugar cane through the cane harvester of this invention. Specifically, sugar cane, as grown in parallel rows enters the gathering assembly 15 at entrance 16. The cane is grasped by gatherer chain 17 and conveyed to the cutting assembly 20. Also present in many embodiments of the sugar cane harvesters which have demonstrated utility with the piler assembly of this invention are cane raising means (not shown in the drawings) which take the form of large Archimedes' screws located on either side of the gathering assembly.

The cutting assembly 20 includes a bottom cutter 21 which severs the bottom of the sugar cane stalk as low to the ground as is reasonably possible. Bottom cutter 21 includes a disc 22 with attached blades 23. Also included in the cutting assembly 20 is a top cutter assembly which is not generally shown or illustrated in these drawings. The top cutter is generally of a type which severs the internode or top of the stalk material and then discards, mulches or otherwise disposes of undesirable upper portions of the sugar cane.

Figure 3:
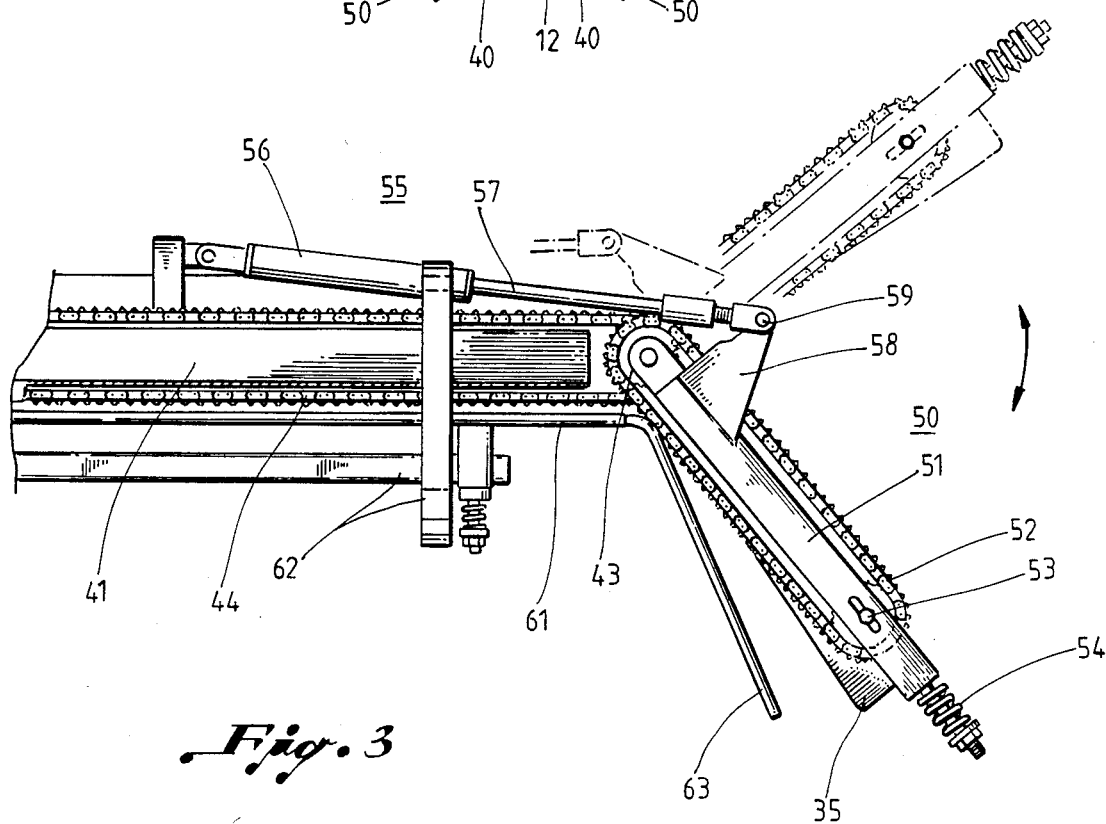
FIG. 3 is an additional top view of the discharge assembly and a portion of the pilar arm assembly.

As the cut cane emerges from the cutting assembly 20 it is engaged by the piler assembly 30. Referring now specifically to FIGS. 2-4, the piler assembly 30 includes as its first subassembly a piler arm assembly 40. Piler arm assembly 40 includes piler arm member 41 to which is attached a first sprocket 42 and a multiple sprocket 43. A first sticker chain 44 is adapted to travel around and be engaged by first sprocket 42 and multiple sprocket 43. A tension sprocket 45 and idler sprocket 46 are also supplied to promote the smooth travel of first sticker chain 44. Sprockets 45 and 46 are supported by member 35. Member 35 is in turn connected to support strut 36 which interconnects with the main support structure of the piler arm assembly 40.

The sticker chain 44 is sometimes referred to herein as means for engaging stalk material. As has been explained previously, the first sticker chain 44 does not necessarily need to be a sticker chain but can be any of a variety of other grasping or frictionally engaging materials.

The piler arm assembly 40 also includes a deflector bar 47 and support member 48. The tension on first sticker chain 44 can be conveniently adjusted by adjusting the pressure on bar 39 by increasing or decreasing the spring loading on spring 38 by adjusting hexagonal nut 37.

Referring specifically to FIGS. 2-3, the discharge assembly 50 is shown as including a discharge arm 51 pivotally attached to piler arm assembly 40 at the junction of multiple sprocket 43. A second sticker chain 52 is configured to travel around multiple sprocket 43 and second sprocket 53. Tension on the second sticker chain 52 is maintained or changed by tension adjust means 54. It is not essential to the proper function of this invention that means be provided for adjusting the tension of the apparatus although it has been found beneficial in commercial application of the improved piler assembly of this invention.

As has been previously mentioned, the discharge assembly 50 of this invention is pivotally attached to piler arm assembly 40 at the common intersection of multiple sprocket 43. Discharge assembly 50 is preferably pivotal from the point of attachment of discharge arm 51 to multiple sprocket 43. The assembly 50 is arcuately movable as demonstrated by the arrows in FIG. 2. In this fashion the discharge assembly can be pivoted to a plurality of fixed positions, at least one of those positions, most notably the position demonstrated by FIG. 2 showing the discharge assembly in a position to specifically direct the direction of fall of the cane. In certain other positions as illustrated by the phantom lines in FIG. 2 the cut cane's fall is not directed by the discharge assembly. Typically, the arcuate movement of discharge assembly 50 is controlled by hydraulic means 55. Hydraulic means 55 includes a cylinder 56, an actuating arm 57 and a pivotal attachment member 58 which is pivotally attached to arm 57 at the point noted as 59. In this fashion the discharge assembly 50 can be hydraulically actuated through an arc as shown specifically in FIG. 2.

The pressure bar assembly of this invention is identified by the number 60 and is shown most specifically in FIG. 4. The pressure bar assembly 60 includes a pressure bar 61 which is specifically aligned in a manner to functionally cooperate with the means for frictionally engaging the stalk material or in the preferred embodiment the first sticker chain 44 in a fashion such that the pressure bar 61 urges at least a portion of the stalk material into contact with the means for frictionally engaging. The tension or placement of pressure bar assembly 61 is adjusted by tension members 64. In certain most preferred embodiments of this invention a pressure rod 63 extends from one end of pressure bar 61. Pressure rod 63 is angularly displaced from linear alignment with pressure bar 61 and in certain instances serves to confine, guide or otherwise direct the fall of cut cane.

As stalk material passes from the first sticker chain to the second sticker chain it has sometimes been found that the second sticker chain will retain a certain amount of leafy material, twigs or other undesirable material. Member 35 is generally described as a triangular plate which is aligned with the second sticker chain to remove any such retained material. The function of this sticker chain wiper is obvious from FIGS. 2 and 3. Although it has been common practice in previous discharge assemblies to require a sticker chain wiper, due to the exceptional utility of the piler assembly of this invention and specifically the double sticker chain arrangement the sticker chain wiper means has become largely superfluous as the interaction of the two sticker chains generally causes them to clean themselves.

Although a typical embodiment of the present invention has been illustrated and discussed herein, numerous modifications and alternative embodiments of the apparatus of this invention will be apparent to those skilled in the art in view of this description. Accordingly, this description is to be construed as illustrative only and is provided for the purpose of teaching those skilled in the art the manner of constructing the apparatus of the invention. It is to be understood that the forms of the invention shown and described herein are to be considered as the presently preferred embodiments. Various changes may be made in the configurations, sizes, and arrangements of the parts of the invention, as will be recognized by those skilled in the art, without departing from the scope of the invention. For example, equivalent elements might be substituted for those illustrated and described herein, parts or connections might be reversed or otherwise interchanged, and certain features of the invention might be utilized independently of the uses of other features, all as will be apparent to one skilled in the art after receiving the benefit attained through reading the foregoing description of the invention.

What is claimed is:

1. An improved automated piler assembly for use in combination with motorized stalk harvesting means, comprising:
    (a) a pair of piler arm assemblies pivotally attached to said motorized stalk harvesting means, each of said piler arm assemblies being movable to a plurality of positions, each of said piler arm assemblies including means for frictionally engaging stalk material, said means for frictionally engaging conveying said stalk material from a cutting assembly to a discharge assembly.
    (b) A pressure bar assembly aligned in a manner to functionally cooperate with said means for frictionally engaging said stalk material, said pressure bar assembly urging at least a portion of said stalk material into contact with said means for frictionally engaging; and
    (c) a pressure rod assembly engaged by one end of said pressure bar assembly, said pressure rod being rigidly and angularly displaced from linear alignment with said pressure bar assembly;
    (d) a discharge assembly fixedly attached to said piler arm assembly, said discharge assembly being movable to a plurality of discharge positions and wherein when said discharge assembly is in close proximity to said pressure rod said discharge assembly cooperates with said pressure rod along a portion of said pressure rod to direct the fall of said stalk material.

2. An improved automated piler assembly as in claim 1, wherein said stalk material is sugar cane.

3. An improved automated piler assembly as in claim 1, wherein said means for engaging stalk material is a first sticker chain.

4. An improved automated piler assembly as in claim 3, wherein said first sticker chain is an endless sticker chain being engaged by a first sprocket at one end of said means for frictionally engaging and a multiple sprocket adapted to engage a plurality of frictional engagement means at the opposite end thereof, at least one of said first sprocket and said multiple sprocket being driven.

5. An improved automated piler assembly as in claim 4, wherein said pressure bar assembly further comprises means for adjusting the pressure urging at least a portion of said stalk material into contact with said first sticker chain.

6. An improved automated piler assembly as in claim 3, wherein said discharge assembly includes
    (a) an arm;
    (b) a multiple sprocket adapted to engage a plurality of frictional engagement means, said multiple sprocket being rotatably attached to the end of said arm adjacent said piler arm assembly;
    (c) a second sprocket in planar alignment with at least a portion of said multiple sprocket, said second sprocket being rotatably attached to said arm and spaced apart from said multiple sprocket; and
    (d) a second sticker chain, said second sticker chain being engaged by said second sprocket and said multiple sprocket.

7. An improved automated piler assembly as in claim 6, wherein said discharge assembly is pivotally mounted on said piler arm assembly.

8. An improved automated piler assembly as in claim 6 wherein said discharge assembly further includes means for disengaging retained material from said second sticker chain said means for disengaging being located along said second sticker chain so as to act upon said retained material before said retained material reaches said second sprocket.

9. An improved automated piler assembly as in claim 1, further comprising hydraulic means for pivoting said discharge assembly.

10. An improved automated sugar cane piler assembly for use in combination with motorized sugar cane harvester cutting means comprising:
    (a) a pair of piler arm assemblies pivotally attached to said sugar cane harvester cutting means, each of said piler arm assemblies movable to a plurality of positions, each of said piler arm assemblies including means for frictionally engaging sugar cane comprising a first sticker chain, said means for frictionally engaging conveying said sugar cane from a cutting assembly to a discharge assembly;
    (b) a discharge assembly pivotally mounted on each of said piler arm assemblies, comprising:
        (i) an arm;
        (ii) a multiple sprocket adapted to engage a plurality of frictional engagement means, said multiple sprocket being rotatably attached to the end of said arm adjacent to said piler arm assembly;
        (iii) a second sprocket in planar alignment with at least a portion of said multiple sprocket, said second sprocket being rotatably attached to said arm and spaced apart from said multiple sprocket; and
        (iv) a second sticker chain, said second sticker chain being engaged by said second sprocket and said multiple sprocket;
    (c) means for moving said discharge assembly to a plurality of discharge positions independent of the position of said piler arm assembly wherein at least one of said discharge positions said discharge assembly directs the fall of said sugar cane and in other positions said discharge assembly does not direct the fall of said sugar cane; and
    (d) a pressure bar assembly aligned in a manner to functionally cooperate with said means for frictionally engaging said sugar cane, said pressure bar assembly urging at least a portion of said stalk material into contact with said first sticker chain;
    (e) a pressure rod assembly engaged by one end of said pressure bar assembly, said pressure rod being rigidly and angularly displaced from linear alignment with said pressure bar assembly such that said pressure rod cooperates with said discharge assembly along a portion of said pressure rod to direct the fall of said stalk material where said discharge assembly is in proximity to said pressure bar.

11. An improved sugar cane piler assembly as in claim 10, wherein said first sticker chain is an endless sticker chain being engaged by a first sprocket at one end of said means for frictionally engaging sugar cane and said multiple sprocket, at least one of said first sprocket and said multiple sprocket being driven.

12. An improved sugar cane piler assembly as in claim 10, wherein said pressure bar assembly further comprises means for adjusting the pressure urging at least a portion of said stalk material into contact with said first sticker chain.

13. An improved automated piler assembly as in claim 10 wherein said discharge assembly further includes means for disengaging retained material from said second sticker chain said means for disengaging being located along said second sticker chain so as to act upon said retained material before said retained material reaches said second sprocket.

14. An improved sugar cane piler assembly as in claim 10, further comprising hydraulic means for pivoting said discharge assembly.

15. An improved automated sugar cane piler assembly for use in combination with a motorized sugar cane harvesting means, comprising:
  (a) a pair of first sticker chain assemblies, pivotally attached to said harvesting means, said first sticker chain assemblies movable to a plurality of positions, each of said sticker chain assemblies engaged at one end of its travel by a single sprocket and at the opposite end of its travel by a multiple sprocket, at least one of said single sprocket and said multiple sprocket being driven, said first sticker chain conveying sugar cane from a cutting assembly to a discharge assembly;
  (b) a discharge assembly pivotally attached to each of said first sticker chain assemblies, comprising:
    (i) an arm;
    (ii) a second sprocket in planar alignment with at least a portion of said multiple sprocket, said second sprocket being rotatably attached to one end of said arm and spaced apart from said multiple sprocket;
    (iii) a second sticker chain, said second sticker chain being engaged by said second sprocket and said multiple sprocket;
    (iv) means for adjusting the tension of said second sticker chain; and
    (v) means for disengaging retained material from said second sticker chain, said means for disengaging being located along said second sticker chain so as to act upon said retained material before said retained material reaches said second sprocket;
  (c) hydraulic means for pivoting said discharge assembly into a plurality of positions wherein at least one of said plurality of positions said discharge assembly directs the fall of said sugar cane;
  (d) a pressure bar assembly aligned in a manner to functionally cooperate with said first sticker chain assembly, said pressure bar assembly urging at least a portion of said stalk material into contact with said first sticker chain, said pressure bar assembly further comprising a pressure rod engaged by one end of said pressure bar assembly, said pressure rod being rigidly and angularly displaced from linear alignment with said pressure bar assembly urging a portion of said stalk material into contact with said discharge assembly along a portion of the length of said discharge assembly and means for adjusting the pressure urging at least a portion of said sugar cane into contact with said first sticker chain.

16. An improved piler assembly as in claims 1 or 10 wherein the piler arm assemblies are movable to a plurality of positions, either independent of or in cooperation with each other.

17. An improved automated piler assembly as in claim 15 wherein said first sticker chain assemblies are movable to a plurality of positions, either independent of or in cooperation with each other.

* * * * *